United States Patent Office 3,542,887
Patented Nov. 24, 1970

3,542,887
CYCLODIMERIZATION PROCESS
Donald V. Hillegass, Kent, Henry R. Menapace, Stow, Neil A. Maly, Tallmadge, and Gereld S. Brenner, Akron, Ohio, assignors to The Goodyear Tire & Rubber Company, Akron, Ohio, a corporation of Ohio
No Drawing. Filed Oct. 23, 1968, Ser. No. 770,075
Int. Cl. C07c 3/10
U.S. Cl. 260—666                                          11 Claims

ABSTRACT OF THE DISCLOSURE

There is disclosed a method of cyclodimerizing 1,3-butadiene hydrocarbons which comprises contacting at least one 1,3-butadiene hydrocarbon, in a solvent system, with a ternary catalyst system comprising (1) at least one material selected from the group consisting of iron salts and iron complexes, (2) at least one reducing agent selected from the group consisting of organometallic compounds and metallic hydrides, the metal portions of which are selected from Groups Ia, IIa, IIb and IIIa of the Periodic System of Elements, and (3) ligands containing

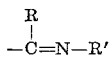

wherein R is a hydrocarbon containing double bond unsaturation in conjunction with the C=N unsaturation.

This invention relates to the cyclodimerization of 1,3-butadiene hydrocarbons. More specifically, it relates to an improved method for the production of high yields of cyclodimers of 1,3-butadiene hydrocarbons at satisfactory reaction rates and a high selectivity to the cyclic dimer.

It has become known that 1,3-butadiene hydrocarbons, substituted and unsubstituted, can be converted catalytically into dimers. These dimers are cyclic in nature and usually take two forms, one wherein all eight of the carbon atoms in the spine of the two moles of the 1,3-butadiene hydrocarbon are in a cyclic ring and the other form being where only a portion of the total number of carbon atoms in the spine of the 1,3-butadiene hydrocarbons is a cyclic ring. Taking the simplest form of a 1,3-butadiene hydrocarbon, 1,3-butadiene, the cyclic dimer containing all of the carbon atoms in the cyclic ring would be 1,5-cyclooctadiene and the form wherein only a portion of the carbon atoms are in the cyclic ring would be vinyl cyclohexene. It is desirable in many instances to convert 1,3-butadiene hydrocarbons into cyclic dimers wherein all of the carbon atoms found in the spine of the 1,3-butadiene hydrocarbon is encompassed in a cyclic ring. For instance, cyclodimers of 1,3-butadienes can be employed as precursors to form dibasic acids, diamines, diisocyanates and other difunctional chemical compounds by well known techniques.

These prior art processes which have been reported use, for instance, a catalyst system comprising a mixture of (1) an iron salt or complex, such as ferric acetylacetonate, (2) a reducing agent, such as triethylaluminum, and (3) a ligand, such as phenyl acetylene or triphenyl phosphine or 2,2'-bipyridyl. The reactions are usually conducted in benzene as a solvent and mild temperatures ranging up to about 50° C. are used.

However, it has been observed that these prior art processes, while a substantial amount of the 1,3-butadiene hydrocarbon is converted into dimer, the selectivity to the desirable cyclodimer, that is, wherein all of the carbon atoms in the spine of the two moles of 1,3-butadiene is encompassed in the cyclic ring, is not too good. For instance, when 1,3-butadiene is dimerized by these prior art processes, the conversion is about 70% which is fair; but the selectivity to 1,5-cyclooctadiene is usually very poor with maximum yields only up to about 33%.

It has been discovered that when certain changes in the operating conditions of these prior processes and a new class of ligands is employed, there is a considerable improvement in both the conversion of the 1,3-butadiene hydrocarbons to the dimer and a rather startling improvement in the selectivity to the completely cyclic form of the dimer and also it has been noted that an improvement is obtained in the reaction rate.

Accordingly, the invention of this application is a process for the conversion of 1,3-butadiene hydrocarbons into cyclic dimers which contain all of the carbon atoms in the spine of the two moles of the butadiene-1,3 hydrocarbon in a cyclic ring. Thus, the invention comprises contacting at least one 1,3-butadiene hydrocarbon, in a solvent system, with a ternary catalyst system comprising (1) at least one material selected from the group consisting of iron salts and iron complexes, (2) at least one reducing agent selected from the group consisting of organometallic compounds and metallic hydrides, the metal portions of which are selected from Groups Ia, IIa, IIb and IIIa of the Periodic System of Elements, and (3) at least one ligand selected from the group consisting of ligands of the formula:

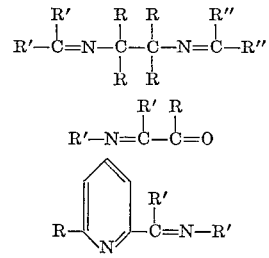

wherein R' and R'' each represent hydrogen and an alkyl radical or a hydrocarbon radical containing double bond unsaturation in conjugation with the C=N unsaturation and at least one R' and at least one R'' is a hydrocarbon radical containing double bond unsaturation in conjugation with the C=N unsaturation, and R represents hydrogen, and an alkyl radical or an aryl radical.

Representative of the 1,3-butadiene hydrocarbons which are cyclodimerized in the practice of this invention are 1,3-butadiene, isoprene or 2-methyl-1,3-butadiene, 2-ethyl-1,3-butadiene, 2-propyl-1,3-butadiene, 2-butyl-1,3-butadiene, piperylene and the like.

The iron salts useful in the practice of this invention are preferably the iron salts of carboxylic acids containing from about 2 to about 40 carbon atoms. Representative but by no means exhaustive of the iron salts of such carboxylic acids include ferric acetate, ferric propionate, ferric isobutyrate, ferric-n-butyrate, ferric trimethyl acetate, ferric n-pentanoate, ferric 3-methyl butyrate, ferric octanoate and various other iron salts of other carboxylic acids containing from about 2 to about 40 carbon atoms.

The iron complexes useful in the invention are the ferric complexes of such agents as 1,3-diketones. Representative of such complexes are ferric 2,4-pentanedionate (commonly called ferric acetylacetonate), ferric-3-methyl-2,4-pentane-dionate, ferric-1-ethoxy-1,3-butanedionate, ferric-1,3-diethoxy-1,3-propanedionate, ferric-1,3-diphenyl-1,3-propanedionate, ferric-1-cyclohexyl-1,3-butanedionate and other ferric complexes of 1,3-diketones.

Also useful in this invention as an iron salt are the ferric salts of alkyl substituted naphthenic carboxylic acids, and the ferric soaps or the soap called iron drier compounds. The ferric salts of individual naphthenic acids are rarely found because the naphthenic acids are usually complex mixtures with their common derivatives being cyclopentane, cyclohexane, cycloheptane and the higher molecular weight alkyl substituted analogs.

The cyclic soaps useful in this invention are usually iron in combination with fatty acids such as stearic rosin (resinates) and tall oil (tallate).

Of all the compounds useful as the ferric salt or ferric complex in this invention, ferric octanoate and ferric acetylacetonate are preferred.

The second component of the catalyst system are reducing agents consisting of at least one member of the class of metal compounds selected from the group consisting of organometallic compounds and hydrides of elements of Groups Ia, IIa, IIb and IIIa of the Periodic System of Elements. The preferred metallic elements from the above groups are lithium, sodium, potassium, magnesium, calcium, boron and aluminum. Representative but not all inclusive of suitable compounds of the above metallic elements are lithium hydride, calcium hydride, aluminum hydride, phenyl sodium, phenyl lithium, n-butyl lithium, tertiary butyl lithium, benzyl potassium, phenyl magnesium chloride, ethyl magnesium bromide, diethyl magnesium, triethyl aluminum, triisobutyl aluminum, dibutyl zinc, diethyl zinc and the like. Trialkylaluminums such as triethylaluminum and alkyllithiums such as n-butyl lithium are preferred organometallic compounds for use with this invention.

The third component of the ternary catalyst system of this invention consists of an organic ligand type molecule. The ligand is believed to direct the reaction toward the cyclodimer formation wherein the cyclodimer contains all of the carbon atoms in the 1,3-butadiene hydrocarbon spine. For instance, the ligand is believed to result in the high selectivity of 1,5-cyclooctadiene from 1,3-butadiene. Ligands which are employed in the present invention are those ligands responding to the formula:

$$R'-\underset{R}{\underset{|}{C}}=N-\underset{R}{\underset{|}{C}}-\underset{}{\overset{R}{\underset{|}{C}}}-N=\underset{}{\overset{R''}{\underset{|}{C}}}-R''$$

wherein R, R' and R" are defined as previously indicated. Representative examples of such ligands are: N,N'-bis-(benzal)-ethylenediamine; N,N'-bis-(4-methoxybenzal)-ethylenediamine; N,N'-bis(benzal)-1,2-dimethylethylenediamine; N,N'-bis-(2-methylbenzal)-ethylenediamine; N,N' - bis(3 - methylbenzal) - ethylenediamine; N,N'-bis(4-methylbenzal)ethylenediamine; N,N'-bis-(4-diethylamino-benzal)-ethylenediamine; and other similar ligands.

Also, those ligands may be employed which respond to the formula:

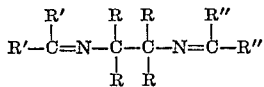

wherein R' and R are defined are previously indicated. Representative of such ligands are: biacetyl-(4-diethylaminoanil); glyoxal-(4-diethylaminoanil); biacetyl-(4-methylanil); glyoxal-(2-methylanil); glyoxal-(2,3-dimethylanil); glyoxal-(2,6-dimethylanil); biacetyl-(2,6-dimethylanil) and other similar ligands.

Also, those ligands responding to the formula:

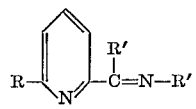

wherein R and R' are defined as previously indicated. Representative of such ligands are: 2-acetylpyridine-anil; 6-methyl - 2-acetylpyridine-anil; 2-acetylpyridine-2-methylanil; 2-formylpyridine-anil; 6-methyl-2-formylpyridine-anil; 2-formylpyridine-3-methylanil; 2-acetylpyridine-2,6-dimethylanil; 2-acetylpyridine-2-chloroanil.

The components of the catalyst system employed in this invention should be as pure as can be economically obtained and the catalyst components as well as the dimerization system should be essentially free of moisture and other deleterious substances.

The ligand to iron mole ratio of the above catalyst system can vary over considerable range. Although there is no definite lower range of ligand to use, sufficient ligand must be employed to assure a high selectivity of the desired cyclodimer. There is no theoretical upper limit to the ligand/$Fe^{+++}$ mole ratio but large excesses of ligand would represent an economic waste. It has been found experimentally that the ligand/$Fe^{+++}$ mole ratios between about 1/1 and 4/1 result in satisfactory cyclodimerization reactions, a ratio of between about 1.5/1 and 3/1 being more preferred.

The mole ratio of the reducing agent to the $Fe^{+++}$ may vary widely. However, no lower limit is specified but sufficient reducing agent must be employed to promote a practical cyclodimerization of the 1,3-butadiene hydrocarbon. It has been determined that when the reducing agent is an alkyllithium compound, the optimum ratio of reducing agent/$Fe^{+++}$ may vary between about 8/1 to about 10/1. When the reducing agent is an alkylaluminum compound, the optimum ratio of reducing agent/$Fe^{+++}$ has been found to vary between about 2/1 and about 6/1.

The total amount of catalyst used is usually based in the ratio of the 1,3-butadiene hydrocarbon to $Fe^{+++}$. Sufficient catalyst concentrations must be present to cause an efficient cyclodimerization reaction and excesses of catalyst will result in an economic waste. It has been found that the 1,3-butadiene hydrocarbon/$Fe^{+++}$ mole ratios can vary from 400/1 up to 10,000 or more/1 with satisfactory reaction rates.

The temperature at which the cyclodimerization process of this invention is conducted may vary from a low temperature of about 50° C. up to 130° C. However, it has been found that the best results have been obtained when the reaction is begun at a temperature of about 100 to 110° C. and then allowed to proceed at a lower temperature, for instance, 75–80° C.

The pressures which are employed in this process can range from ambient pressure created by the monomer/solvent system at operating temperature or extremely high pressures can be maintained by use of inert gas. It is practical to employ pressures from the ambient pressure up to about 400 p.s.i.g.

It is usually desirable, but not necessary, to conduct the cyclodimerization in the presence of an inert diluent or solvent. The term "inert" is meant to denote that the solvent has no adverse effect on the reaction. Representative of such solvents are benzene, toluene, xylene, hexane, heptane, pentane and the like. Mixtures may also be employed and it is usually preferred to employ benzene or toluene. Bulk dimerizations may also be employed utilizing the 1,3-butadiene hydrocarbon as the solvent with no additional solvent. If a solvent is used, the concentration of the 1,3-butadiene hydrocarbon to the solvent may vary from about 1/1 to about 15/1 based on volume. This concentration is not important.

In the practice of this invention it is usually desirable to employ air-free and moisture-free techniques.

The practice of this invention is further illustrated by reference to the following examples which are intended to be representative rather than restrictive of the scope of the invention. Unless otherwise noted, all parts and percentages are by weight.

EXAMPLES

In these examples, which were conducted in a 300 milliliter stainless-steel, stirred autoclave, the reactants were mixed in the following order: the particular 1,3-butadiene hydrocarbon was dissolved in the solvent; the particular iron salt or iron complex and the particular ligand was added. The mixture was brought up to the operating temperautre at which time the reducing agent was added. The reaction time was counted from the addition of the reducing agent until the reaction was stopped by destroying the catalyst with the addition of an excess of isopropanol based on the total catalyst. The results were determined by vapor phase chromatography employing conventional techniques. In these examples the ligands are listed, the reaction conditions are set forth and the mole ratio of the reactants is reported in moles of each reactant and 1,3-butadiene hydrocarbon employed. The solvent 1,3-butadiene hydrocarbon volume ratio is given. The results obtained are reported in the percent conversion of the 1,3-butadiene hydrocarbon converted to dimer and the percent selectivity to each of the particular dimers formed.

In these examples where the ratios of the iron salts to the organometallic reducing agents to the ligand to the diolefin are reported as Fe/N/Al/butadiene respectively. The mole ratios are reported in moles of each component employed in each example, regardless of the number of atoms in each compound.

Example I

Reactants: Butadiene, ferric octanoate, triethylaluminum, N,N'-bis-(benzal)-ethylenediamine.

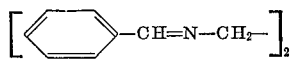

Conditions:

Temperature—97–120° C.
Pressure—130–425 p.s.i.g.
Time—60 min.
Solvent—Benzene
Solvent/1,3-butadiene ratio—about 6.8/1

Catalyst ratios: Fe/N/Al/butadiene mole ratio $$=0.0002/0.0004/0.0010/0.1$$

Results:

| | Percent |
|---|---|
| Conversion | 33 |
| Selectivity to 1.5-cyclooctadiene | 34 |
| Selectivity to 4-vinylcyclohexene | 12 |

Example II

Reactants: Butadiene, ferric octanoate, triethylaluminum, biacetyl-(4-diethylaminoanil).

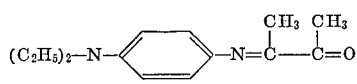

Conditions:

Temperature—99.104° C.
Pressure—155–393 p.s.i.g.
Time—15 min.
Solvent—Benzene
Solvent/1,3-butadiene ratio—about 6.8/1

Catalyst ratios: Fe/N/Al/butadiene mole ratio $$=0.0002/0.00054/0.001/0.1$$

Results:

| | Percent |
|---|---|
| Conversion | 61 |
| Selectivity to 1,5-cyclooctadiene | 46 |
| Selectivity to 4-vinylcyclohexene | 13 |

Example III

Reactants: Butadiene, ferric octanoate, triethylaluminum, 2-acetylpyridineanil

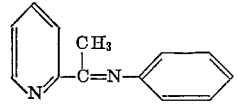

Conditions:

Temperature—100–102° C.
Pressure—165–448 p.s.i.g.
Time—15 min.
Solvent—Benzene
Solvent/1,3-butadiene ratio—about 6.8/1

Catalyst ratios: Fe/N/Al/butadiene mole ratios $$=0.0002/0.0004/0.0008/0.1$$

Results:

| | Percent |
|---|---|
| Conversion | 97 |
| Selectivity to 1.5-cyclooctadiene | 75 |
| Selectivity to 4-vinylcyclohexene | 21 |

While certain representative embodiments and details have been shown for the purpose of illustrating the invention, it will be apparent to those skilled in this art that various changes and modifications may be made therein without departing from the spirit or scope of the invention.

What is claimed is:

1. The method of cyclodimerizing 1,3-butadiene hydrocarbons which comprises contacting at least one 1,3-butadiene hydrocarbon, in a solvent system, with a ternary catalyst system comprising (1) at least one material selected from the group consisting of iron salts and iron complexes, (2) at least one reducing agent selected from the group consisting of organo-metallic compounds and metallic hydrides, the metal portions of which are selected from Groups Ia, IIa, IIb and IIIa of the Periodic System of Elements, and (3) at least one ligand selected from the group consisting of:

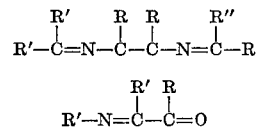

and

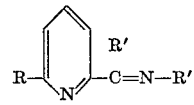

wherein R' and R" each represent hydrogen and an alkyl radical or a hydrocarbon radical containing double bond unsaturation in conjugation with the C=N unsaturation and at least one R' and at least one R" is a hydrocarbon radical containing double bond unsaturation in conjugation with the C=N unsaturation, and R represents hydrogen, and an alkyl radical or an aryl radical.

2. The method according to claim 1 in which the 1,3-butadiene hydrocarbon is butadiene-1,3.

3. The method according to claim 1 in which the 1,3-butadiene hydrocarbon is isoprene.

4. The method according to claim 1 in which the ligand is 2-acetylpyridine-anil.

5. The method according to claim 1 in which the ligand is 2-acetylpyridine-2-methylanil.

6. The method according to claim 1 in which the ligand is biacetyl-(4-diethylaminoanil).

7. The method according to claim 1 in which the ligand is N,N'-bis-(benzal)-ethylenediamine.

8. The method according to claim 1 in which the iron salt is ferric octanoate.

9. The method according to claim 1 in which the reducing agent is trialkyl aluminum.

10. The method according to claim 1 in which the 1,3-butadiene hydrocarbon is butadiene-1,3; the ligand is 2-acetylpyridine-anil; the iron salt is ferric octanoate and the reducing agent is a trialkyl aluminum.

11. The method according to claim 1 in which the mole ratio of ligand to iron salt varies from about 1/1 to about 4/1 and the mole ratio of the reducing agent to the iron salt varies from about 8/1 to about 10/1.

References Cited

UNITED STATES PATENTS

| | | | |
|---|---|---|---|
| 3,446,861 | 5/1969 | Menapace et al. | 260—666 |
| 3,446,862 | 5/1969 | Menapace et al. | 260—666 |
| 3,149,174 | 9/1964 | Mueller | 260—666 |
| 3,201,484 | 8/1965 | Myers et al. | 260—666 |

DELBERT E. GANTZ, Primary Examiner

V. O'KEEFE, Assistant Examiner

PO-1050
(5/69)

UNITED STATES PATENT OFFICE
CERTIFICATE OF CORRECTION

Patent No. 3,542,887      Dated November 24, 1970

Inventor(s) Donald V. Hillegass, Henry R. Menapace
Gereld S. Benner and Neil A Maly.

It is certified that error appears in the above-identified patent and that said Letters Patent are hereby corrected as shown below:

Column 1, line 4, one of the inventors' name is misspelled,

"Gereld S. Brenner" should read

-- Gereld S. Benner --;

Column 5, under Example II after "Temperature" should read

-- 99-104° C. --;

Column 6, under Example III, about line 22, should read

-- Selectivity to 1,5-cyclooctadiene -- .

Claim 1, the first formula should read as follows:

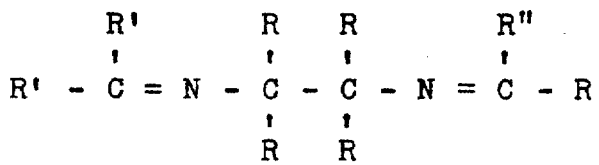

Signed and sealed this 7th day of September 1971.

(SEAL)
Attest:

EDWARD M. FLETCHER, JR.　　　ROBERT GOTTSCHALK
Attesting Officer　　　　　　　Acting Commissioner of Pater